(12) United States Patent
Feeley et al.

(10) Patent No.: US 6,471,924 B1
(45) Date of Patent: Oct. 29, 2002

(54) METHOD AND APPARATUS FOR $NO_x$ ABATEMENT IN LEAN GASEOUS STREAMS

(75) Inventors: Jennifer S. Feeley, Clinton, NJ (US); Robert J. Farrauto, Westfield, NJ (US); Michel Deeba, North Brunswick, NJ (US)

(73) Assignee: Engelhard Corporation, Iselin, NJ (US)

(*) Notice: Subject to any disclaimer, the term of this patent is extended or adjusted under 35 U.S.C. 154(b) by 0 days.

(21) Appl. No.: 08/645,363

(22) Filed: May 13, 1996

Related U.S. Application Data

(63) Continuation-in-part of application No. 08/500,657, filed on Jul. 12, 1995, now Pat. No. 5,874,057.

(51) Int. Cl.[7] .......................... B01D 53/56; C01B 21/24
(52) U.S. Cl. ........................ 423/213.5; 60/286; 60/299; 422/171; 422/172; 422/177; 423/213.7; 423/239.1; 423/239.2
(58) Field of Search ..................... 423/213.5, 213.7, 423/239.1, 239.2; 60/286, 299; 422/171, 172, 177

(56) References Cited

U.S. PATENT DOCUMENTS

| | | | |
|---|---|---|---|
| 3,784,675 A | 1/1974 | Kobylinski et al. | 423/213.5 |
| 3,801,697 A | 4/1974 | Kobylinski et al. | 423/213.7 |
| 3,809,743 A | 5/1974 | Unland et al. | 423/213.5 |
| 3,907,968 A | 9/1975 | Kobylinski et al. | 423/213.5 |
| 4,105,590 A | 8/1978 | Koberstein et al. | 502/151 |

(List continued on next page.)

FOREIGN PATENT DOCUMENTS

| | | |
|---|---|---|
| EP | 0068796 | 1/1983 |
| EP | 503882 | 9/1992 |
| EP | 537942 | 4/1993 |
| EP | 537968 | 4/1993 |
| EP | 0 540 280 A1 | 5/1993 |

(List continued on next page.)

OTHER PUBLICATIONS

Takahashi et al, "The New Concept 3–Way Catalyst for Automotive Lean–Burn Engine Storage & Reduction Catalyst" May 1995, pp. 45–48, proceedings of "Environmental Catalyst" Congress, Pisa, Italy.

Miyoshi et al, "Development of New Concept Three–Way Catalyst for Automotive Lean–Burn Engines", SAE # 950809 Feb. 1995.

(List continued on next page.)

*Primary Examiner*—Wayne A. Langel
(74) *Attorney, Agent, or Firm*—Richard A. Negin

(57) ABSTRACT

A method for reduction of $NO_x$ in a lean gaseous stream includes passing the gaseous stream at a temperature within the $NO_x$ sorbing temperature range through a catalyzed trap member having an oxidation catalyst intimately combined with a sorbent material. The sorbed $NO_x$ is periodically removed by introducing a combustible component into the gaseous stream and oxidizing it on the trap member to thermally desorb the $NO_x$. The amount of combustible component introduced is limited to maintain the gaseous stream bulk composition lean and to avoid increasing the bulk temperature of the gaseous stream to a temperature which is too high for effective lean $NO_x$ abatement treatment. A suitable $NO_x$ abatement catalyst is used to reduce the desorbed $NO_x$. Sorbing (trapping) and desorbing periods are alternated, usually in response to the temperature of the gaseous stream, and an apparatus to carry out the process is provided.

23 Claims, 10 Drawing Sheets

U.S. PATENT DOCUMENTS

| | | | |
|---|---|---|---|
| 4,188,364 A | 2/1980 | Gladden | 423/213.2 |
| 4,206,087 A | 6/1980 | Keith et al. | 502/304 |
| 4,261,862 A | 4/1981 | Kinoshita et al. | 502/304 |
| 4,274,981 A | 6/1981 | Suzuki et al. | 502/178 |
| 4,289,737 A | 9/1981 | Acres et al. | 423/245.3 |
| 4,380,510 A | 4/1983 | D'Aniello, Jr. | 502/332 |
| 4,431,746 A | 2/1984 | Rollmann | 502/73 |
| 4,552,733 A | 11/1985 | Thompson et al. | 423/213.5 |
| 4,742,038 A | 5/1988 | Matsumoto | 502/303 |
| 4,849,398 A | 7/1989 | Takada et al. | 502/303 |
| 4,880,764 A | 11/1989 | Imai et al. | 502/326 |
| 4,902,664 A | 2/1990 | Wan | 502/300 |
| 4,963,332 A | 10/1990 | Brand et al. | 423/235 |
| 4,977,129 A | 12/1990 | Ernest | 502/330 |
| 5,024,981 A | 6/1991 | Speronello et al. | 502/67 |
| 5,041,272 A | 8/1991 | Tamura et al. | 423/239.2 |
| 5,078,979 A | 1/1992 | Dunne | 423/212 |
| 5,128,306 A | 7/1992 | Dettling et al. | 502/304 |
| 5,155,994 A | 10/1992 | Muraki et al. | 60/275 |
| 5,202,300 A | 4/1993 | Funabiki et al. | 502/300 |
| 5,260,249 A | 11/1993 | Shiraishi et al. | 502/304 |
| 5,330,732 A | 7/1994 | Ishibashi et al. | 423/213.2 |
| 5,376,610 A | 12/1994 | Takahata et al. | 502/66 |
| 5,382,416 A | 1/1995 | Nakano et al. | 423/213.2 |
| 5,427,989 A * | 6/1995 | Kanesaka et al. | 423/239.2 |
| 5,491,975 A | 2/1996 | Yamashita et al. | 60/276 |
| 5,543,124 A * | 8/1996 | Yokota et al. | 423/213.5 |

FOREIGN PATENT DOCUMENTS

| | | | |
|---|---|---|---|
| EP | 580389 | | 1/1994 |
| EP | 0 581 279 A2 | | 2/1994 |
| EP | 582917 | * | 2/1994 |
| EP | 613714 | | 9/1994 |
| GB | 2238784 | | 6/1991 |
| GB | 91-359353 | | 10/1991 |
| JP | 50-17394 | | 2/1975 |
| JP | 1135541 | | 5/1989 |
| JP | 7-108172 | * | 4/1995 |
| JP | 07-108172 | | 4/1995 |
| WO | WO 94/04258 | | 3/1994 |
| WO | WO 95/00235 | | 5/1995 |

OTHER PUBLICATIONS

Hirabayashi et al, High Catalytic Activity of Platinum–ZSM–5 Zeolite Below 500 K In Water Vapor for Reduction on Nitrogen Monoxide, Chemistry Letters, 1992, pp 2235–2236.

Iwamoto et al, Performance and Durability of Pt–MFI Zeolite Catalyst for Selective Reduction of Nitrogen Monoxide in Actual Diesel Engine Exhaust, Applied Catalysis, B. Env., 1994, pp L1–L6.

* cited by examiner

METHOD AND APPARATUS FOR NO$_x$ ABATEMENT IN LEAN GASEOUS STREAMS

CROSS-REFERENCE TO RELATED APPLICATION

This application is a continuation-in-part of application Ser. No. 08/500,657, filed on Jul. 12, 1995, U.S. Pat. No. 5,874,057 in the name of M. Deeba et al for "Lean NO$_x$ Catalyst/Trap and Method of Using the Same".

BACKGROUND OF THE INVENTION

Field of the Invention

The present invention is broadly concerned with lean NO$_x$ abatement in gaseous streams such as the exhaust of lean-burn internal combustion engines, e.g., diesel engines. More specifically, the present invention is concerned with a novel method and an apparatus for carrying out the method, comprising use of a trap member having thereon an intimate combination of a sorbent material and an oxidation catalyst.

The art has devoted some effort to developing catalysts specifically designed to abate NO$_x$ in lean exhaust streams. One such effort is described at pages 45–48 of *Environmental Catalysis For A Better World And Life*, Proceedings of the 1st World Congress at Pisa, Italy, May 1–5, 1995, published by the Societa Chimica Italian of Rome, Italy, in an article entitled "The New Concept 3-Way Catalyst For Automotive Lean-Burn Engine Storage and Reduction Catalyst", by Takahashi et al (below referred to as "the Takahashi et al paper"). This article discloses the preparation of catalysts by impregnating precious metals, mainly platinum, and various alkaline and alkaline earth metal oxides, mainly barium oxide and rare earth metal oxides, on supports, mainly alumina. At page 47 of the article, there is, shown both graphically in FIG. 5 and discussed in paragraph 3.1.1., "NO$_x$ Storage Mechanism", the concept of employing NO$_x$ storage compounds and three-way conversion ("TWC") catalytic components dispersed on a common support material. TWC catalysts are well known in the art and are capable of substantially simultaneously catalyzing the oxidation of hydrocarbons and carbon monoxide and the reduction of nitrogen oxides. However, TWC catalysts require stoichiometric or rich gas conditions in order to convert NO$_x$ desorbed from the sorbent material.

SAE paper 950809 published by the Society of Automotive Engineers, Inc., Warrendale, Pa., and entitled *Development of New Concept Three-Way Catalyst for Automotive Lean-Burn Engines*, by Naoto Miyoshi et al, was delivered at the International Congress and Exposition, Detroit, Mich., Feb. 27–Mar. 2, 1995. This paper, referred to below as "the SAE paper", deals with gaseous streams at rich or stoichiometric conditions and discloses at page 123 a correlation between basicity of the elements used as NO$_x$ storage material and NO$_x$ storage capacity. Also discussed is NO$_x$ adsorption by complex oxides such as YBa$_2$Cu$_3$Oy and CuO-BaO. The SAE paper also references "Uptake of NO gas by YBa$_2$Cu$_3$Oy" by K. Tabata et al, *Chem. Lett.*, 1988, pp. 799–802 and "NO removal by adsorption into BaO-CuO binary oxides" by M. Machida et al, *J. Chem. Soc. Chem. Commun.* 1990, pp. 1165–1166.

U.S. Pat. No. 5,202,300, "Catalyst For Purification of Exhaust Gas", issued on Apr. 13, 1993, to M. Funabiki et al, discloses a catalyst composition comprising a refractory support having deposited thereon an active layer containing a palladium and rhodium catalytic metal component dispersed on alumina, a cerium compound, a strontium compound and a zirconium compound.

SUMMARY OF THE INVENTION

Generally, the present invention provides a method for treating a lean, NO$_x$-containing gaseous stream, the temperature of which fluctuates and may remain for periods of time within a temperature range which is unsuitable for catalytic abatement of NO$_x$. The method provides for using a trap member containing an intimate combination of a NO$_x$ sorbent and an oxidation catalyst and sorbing NO$_x$ onto the trap member during those selected periods of time, e.g., when the temperature of the gaseous stream is not suited for catalytic lean NO$_x$ abatement. During other periods of time, e.g., when the temperature of the gaseous stream being treated is suitable for catalytic lean NO$_x$ abatement, the method provides for introducing a combustible component, e.g., hydrocarbons, into the trap member in amounts which are limited in order to maintain the bulk or overall composition of the gaseous stream at lean conditions, and oxidizing the combustible component thereon to thermally desorb the NO$_x$ from the trap member without significantly raising the bulk temperature of the gaseous stream. The resulting NO$_x$-enriched gaseous stream can be more efficiently treated to abate NO$_x$ for two reasons. One is because of its increased NO$_x$ concentration relative to the source gaseous stream and the other is because its bulk temperature need not be heated to NO$_x$ thermal desorption temperatures which are higher than the temperature window for most or many lean NO$_x$ abatement methods. The source of the gaseous stream, e.g., a diesel engine or a lean-burn gasoline engine, need not be subjected to periods of rich or stoichiometric operation to desorb the NO$_x$ and reduce it over a TWC catalyst, but may operate continuously under lean conditions. The amount of combustible component, e.g., hydrocarbon, introduced to effectuate the thermal desorption need not be so much as to convert the lean gaseous stream to a hydrocarbon (fuel)-enriched gaseous stream.

In accordance with the present invention there is provided a method for the reduction of NO$_x$ in a lean NO$_x$-containing gaseous stream, e.g., the exhaust of a diesel engine. The method comprises the following steps. The lean gaseous stream is passed through a catalyzed NO$_x$ trap member comprising an intimate combination of a catalyst material effective for promoting the oxidation of a combustible component in the gaseous stream, and a NO$_x$ sorbent material. The gaseous stream is passed through the trap member within a sorbing temperature range to sorb NO$_x$ in the trap member whereby to establish a trapping period and provide a NO$_x$-depleted gaseous stream exiting the trap member during the trapping period. The gaseous stream exiting the trap member is then passed through a lean NO$_x$ reduction catalyst member. The combustible component is introduced into the gaseous stream at a location upstream of the trap member under conditions to combust the combustible component on the trap member, the combustible component being introduced in an amount which is limited in order to maintain the bulk composition of the gaseous stream lean but which is sufficient to heat at least a portion of the trap member to a release temperature sufficient to release trapped NO$_x$ from the trap member into the gaseous stream exiting the trap member, thence through the catalyst member. This serves to establish a desorbing period. Lean NO$_x$-reduction conditions are maintained in the catalyst member at least during the desorbing period, e.g., by supplying a NO$_x$ reductant to the catalyst member, and the establishment of the trapping period and the desorbing period is alternated.

One aspect of the present invention comprises introducing a NO$_x$ reductant into the lean gas stream between the trap member and the catalyst member.

Another aspect of the present invention provides for maintaining a molar ratio of reductant (on a $C_1$ basis) to $NO_x$ of from about 0.5 to 8, preferably from 1 to 4, in the gaseous stream entering the catalyst member.

Other aspects of the present invention include one or more of the following features, alone or in combination: introducing the combustible component upstream of the trap member in an amount sufficient to supply from the combustible component at least part of the $NO_x$ reductant, and maintaining lean $NO_x$ reduction conditions in the catalyst member even while passing the $NO_x$-depleted gaseous stream therethrough.

The present invention also provides for carrying out the method wherein the $NO_x$ sorbent material comprises at least one basic oxygenated compound and the catalytic metal component of the catalyst material intimately combined with the sorbent material may comprise one or more catalytic metal components, e.g., platinum group metal components, and preferably platinum. As for the catalyst member positioned downstream of the trap member, i.e., to receive the gaseous stream discharged therefrom, the catalyst member comprises a lean $NO_x$ abatement catalyst selected from the group consisting of a platinum catalytic component and a metal-promoted zeolite. In one embodiment of the invention, the $NO_x$-sorbent material is selected from the group consisting of one or more of metal oxides, metal carbonates, metal hydroxides and mixed metal oxides and the catalyst member comprises a lean $NO_x$ abatement catalyst selected from the group consisting of a platinum catalytic metal component dispersed on a suitable support material and a copper or platinum catalytic component supported on a zeolite (molecular sieve), e.g., ZSM-5. The sorbent material may be present in bulk form, i.e., as fine, solid particles, or it may be dispersed on a suitable support material, i.e., fine solid particles of an oxide such as gamma-alumina. The terms "bulk" and "dispersed on" as used to describe a material are defined below.

Another aspect of the invention provides for the sorbent material to be segregated from the catalytic metal component of the oxidation catalyst, at least to the extent that (a) when the sorbent material is dispersed on a support material, the catalytic metal component and the sorbent material are not dispersed on the same increment of support material, and (b) when the sorbent material is in bulk form, the catalytic metal component is not incorporated into the bulk sorbent material.

Still other aspects of the present invention provide for maintaining the gaseous stream exiting the trap member within a temperature range below that of the release temperature range, and preferably within an operating temperature range effective for lean $NO_x$ abatement at least during the desorption periods.

Yet another aspect of the present invention provides an apparatus for the reduction of $NO_x$ in a lean, $NO_x$-containing gaseous stream. The apparatus comprises the following components: an inlet conduit which is dimensioned and configured for connection in flow communication to a source of a lean gaseous stream containing $NO_x$; a catalyzed $NO_x$ trap member having a trap inlet and a trap outlet, the trap inlet being connected in flow communication to the inlet conduit, the trap member comprising an intimate combination catalyst material effective for promoting the oxidation of hydrocarbons in the gaseous stream and a $NO_x$ sorbent material; a $NO_x$ catalyst member having a catalyst inlet and a catalyst outlet; a connector conduit connecting the trap outlet to the catalyst inlet in flow communication; combustible component inlet means connected in flow communication to the inlet conduit; and control means associated with the inlet conduit to permit intermittent injection of a combustible component into the inlet conduit.

The apparatus may further include a reductant inlet conduit having one end dimensioned and configured for connection to a source of a $NO_x$ reductant and an opposite end connected in flow communication to the connector conduit. The $NO_x$ trap member and $NO_x$ abatement catalyst may be those described above. Control means may also be associated with the reductant conduit to permit controlled injection of a $NO_x$ reductant into the connector conduit for introduction into the $NO_x$ catalyst member.

Another aspect of the present invention provides for the sorbent material to be segregated to a degree from the catalytic metal component in the intimate combination of the two. Such segregation is provided at least to the extent that (a) when the sorbent material is dispersed on a refractory support material, the catalytic metal component and the sorbent material are not dispersed on the same increment of refractory support material, and (b) when the sorbent material is in bulk form, the catalytic metal component is not, incorporated, e.g., impregnated into the bulk sorbent material.

As used herein and in the claims, the following terms, whether used in singular or plural form, have the indicated meanings.

Reference to a "catalytic metal component", or a "platinum metal component", or to a metal or metals comprising the same, means a catalytically effective form of the metal or metals, whether the metal or metals are present as the element, an alloy or a compound.

The term "platinum group metals" means and includes platinum, rhodium, palladium, ruthenium, iridium and osmium.

The term "washcoat" has its usual meaning in the art of a thin, adherent coating of a catalytic or other material applied to a refractory carrier material such as a honeycomb-type carrier member, and which is porous to permit the passage therethrough of the gas stream being treated.

A "bulk" component means a component which is present as fine, solid particles, i.e., as a powder. The particles are usually quite small in size, on the order of, e.g., at least ninety percent of the particles being from 5 to 15 microns in diameter. For example, a bulk sorbent material is a powder of strontium oxide.

A component is "dispersed" onto a bulk support material by immersing the bulk support material into a solution or other liquid suspension of the component or a precursor thereof. For example, the sorbent strontium oxide may be dispersed onto an alumina support material by soaking bulk alumina in a solution of strontium nitrate (a precursor of strontia), drying the soaked alumina particles and heating them, e.g., in air at a temperature of 450° C. to 750° C. (calcining) to convert the strontium nitrate to strontium oxide dispersed on the alumina support materials.

The term "gaseous stream" means a stream of gaseous constituents, such as the exhaust of an internal combustion engine, which may contain entrained non-gaseous components such as liquid droplets, solid particulates and the like.

The abbreviation "TOS" means time on stream and the abbreviation "HC" means hydrocarbon.

The term "lean" used with reference to a mode of treatment (such as "lean $NO_x$ abatement") or a gaseous stream, means that the gaseous stream being subjected to the treatment, or the gaseous stream referred to, contains more oxygen than the stoichiometric amount of oxygen needed to oxidize the entire reductants content, e.g., HC, CO and $H_2$, of the gaseous stream.

The term "mixed metal oxide" means bi-metallic or multi-metallic oxygen compounds, such as $Ba_2SrWO_6$, which are true compounds, and is not intended to embrace mere mixtures of two or more individual metal oxides such as a mixture of SrO and BaO.

The use of weight per volume units such as "$g/in^3$", or "$g/ft^3$" describes the weight of a component per volume of catalyst or trap member including the volume thereof attributed to void spaces such as gas flow passages.

The term "effective operating temperature range" of a lean $NO_x$ abatement catalyst means the temperature range in which the catalyst is effective to promote reduction of at least about ten percent of the $NO_x$ contained in the gaseous stream fed to the catalyst when an adequate supply of reductant is present.

The term "increment" of a support material means a batch or portion of support material; references to components not being disposed on the same "increment" of support material simply means that the components are not dispersed on the same particles, but each component is dispersed on its own batch of particles.

DETAILED DESCRIPTION OF THE INVENTION AND SPECIFIC EMBODIMENTS THEREOF

Figure 1:
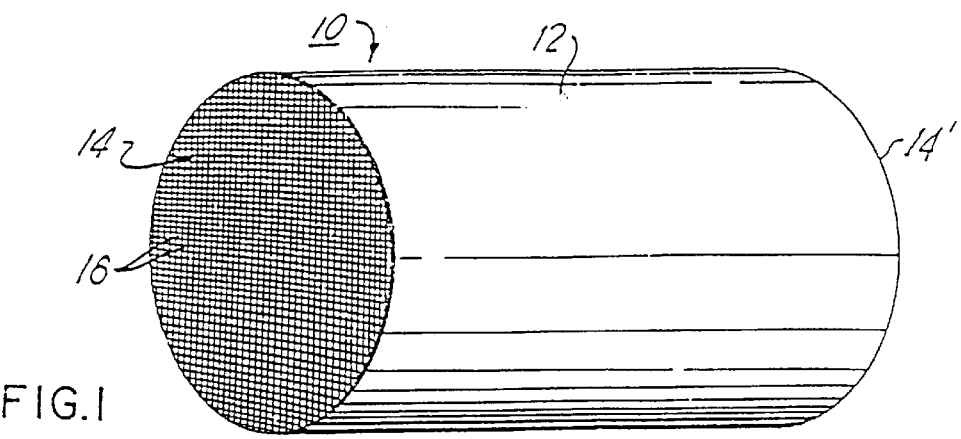
FIG. 1 is a perspective view of a honeycomb-type refractory carrier member which may comprise a $NO_x$ trap member or a $NO_x$ catalyst member in accordance with particular embodiments of the present invention depending on the composition of the washcoat layer coated on the walls of the gas flow passages thereof.

Parent patent application Ser. No. 08/500,657 discloses a method of NO. abatement in exhaust gases wherein, during lean operation, $NO_x$ is sorbed by a catalyzed trap member containing a sorbent material and a TWC catalyst. In order to later desorb $NO_x$ from the catalyzed trap member, lean operation of the engine generating the exhaust being treated must be changed to stoichiometric or rich operation. The resulting increased concentration of reductants such as carbon monoxide, hydrogen and/or hydrocarbons causes $NO_x$ to be desorbed from the catalyzed trap material and reduced over the TWC catalyst of the material. Upon a subsequent return to lean operation, $NO_x$ sorption is recommenced by the $NO_x$-sorbent material. This mode of operation, alternating lean and stoichiometric or rich engine operation periods, is inconvenient in the case of a gasoline-fueled engine. Not only is fuel economy compromised by the necessity of frequent periods of stoichiometric or rich operation, but the operating conditions of the engine must be periodically changed, not to meet any needs of or demands on the engine, but merely to accommodate the catalyst system. In the case of diesel engines which operate at all times at lean conditions, operation under stoichiometric or rich conditions is not possible, so the method of the parent case is not readily adaptable to the treatment of diesel engine exhaust.

An alternative to using stoichiometric or rich engine operating conditions to desorb the $NO_x$ would be to thermally desorb $NO_x$ from the $NO_x$ sorbent material by increasing the temperature of the gaseous stream being fed to the $NO_x$ trap member. However, aside from the energy required to heat the entire gaseous stream to within a $NO_x$ desorption temperature range, the gaseous stream emerging from the $NO_x$ trap member would be at an elevated temperature too high for successful treatment by a lean $NO_x$ abatement catalyst. Lean $NO_x$ abatement catalysts generally have a limited effective operating temperature range. For example, for platinum catalytic metal containing lean $NO_x$ abatement catalysts, the effective operating temperature range is generally from about 200° C. to 275° C. and for metal-promoted zeolite lean $NO_x$-abatement catalysts the effective operating temperature range is generally from about 375° C. to 550° C. Thermal desorption of $NO_x$ from the trap member by the gaseous stream would require heating the gaseous stream to temperatures well above the effective operating temperature range of many lean $NO_x$ abatement catalysts, i.e., well above the temperature range in which a $NO_x$ abatement catalyst, such as a platinum catalytic component-containing catalyst, would be efficacious. Of course, it is possible to effect interstage cooling of the gaseous stream between the trap member and the catalyst member and to do so is within the purview of the present invention. However, it is obviously preferable not to have to undergo the expense of providing such interstage cooling if such can be avoided simply by not overheating the gaseous stream during the desorbing period. The method of the present invention can readily desorb $NO_x$ over a temperature range of, e.g., 150 to 450° C. while increasing the bulk temperature of the gas by not more than about 25° C., e.g., by only about 5 to 15° C.

The present invention is based on the finding that the trap member, or at least part or all of the $NO_x$ sorbent material contained thereon, may be locally heated to a temperature within the $NO_x$ desorption temperature range by the introduction of a combustible component into the gaseous stream being fed to the trap member. The invention provides a suitable oxidation catalyst in intimate combination with the $NO_x$ sorbent material on the $NO_x$ trap member, the catalyst serving to promote combustion of the combustible component at or very close to the $NO_x$ sorbent material. Such intimate combination can be attained either by admixing particles of the $NO_x$ sorbent material and particles of the oxidation catalyst or by applying them to a substrate in respective, discrete, overlying layers.

The combustible component is periodically, e.g., in response to the temperature of the gaseous stream, introduced into the gaseous stream being fed to the trap member to initiate periodic abatement periods during which oxidation conditions are maintained at the trap member. These conditions include sufficient oxygen and a temperature high enough for the oxidation catalyst to promote combustion of the combustible component. Many gaseous streams, such as the exhaust of a diesel engine, are inherently at such oxidation conditions. For example, the temperature of diesel exhaust introduced into the $NO_x$ trap member will typically be from about 50 to 750° C. and the oxygen content will be from about 3 to 19 volume percent. The amount of combustible component introduced is controlled to provide sufficient heating of at least portions of the $NO_x$ sorbent material on the trap member to thermally desorb $NO_x$ therefrom without, however, heating the gaseous stream so as to raise its bulk temperature significantly. This keeps the gaseous stream exiting the trap member at a temperature low enough for effective lean $NO_x$ abatement treatment in the lean $NO_x$ abatement catalyst without the necessity of cooling the gaseous stream between the trap member and the lean $NO_x$ abatement catalyst. Lean $NO_x$ abatement conditions are thus maintained within the lean $NO_x$ abatement catalyst by maintaining the temperature of the gaseous stream within an effective $NO_x$ abatement temperature range and providing an adequate amount of $NO_x$ reductant. A typical diesel engine exhaust is, for certain operating conditions of the engine, inherently at an appropriate temperature for lean $NO_x$ abatement and a suitable $NO_x$ reductant, such as diesel fuel, may be added to the gaseous stream fed to the lean $NO_x$ abatement catalyst. When the supply of combustible component is cut off and the trap member cools to within the $NO_x$ sorption temperature range, the desorption period ends and $NO_x$ sorption recommences in a new trapping period.

Figure 1A:
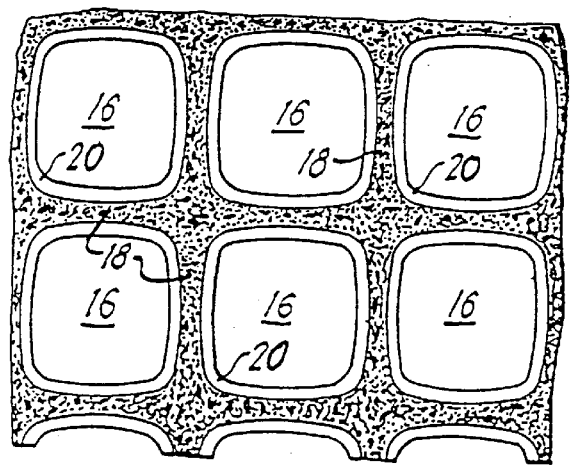
FIG. 1A is a partial cross-sectional view enlarged relative to FIG. 1 and taken along a plane parallel to the end faces of the carrier of FIG. 1.
Figure 1B:
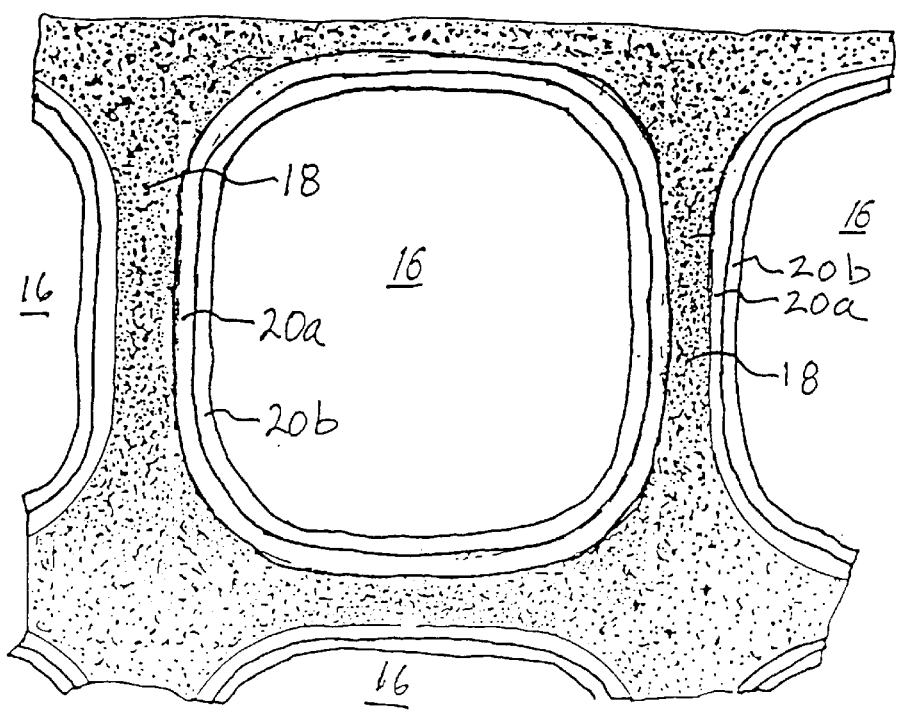
FIG. 1B is a view enlarged relative to FIG. 1A of one of the gas flow passages shown in FIG. 1A.

FIG. 1 shows generally at 10 a refractory carrier member of generally cylindrical shape having a cylindrical outer surface 12, one end face 14 and an opposite end face, not visible in FIG. 1, which is identical to end face 14. The junction of outer surface 12 with the opposite end face at its peripheral edge portion is indicated at 14' in FIG. 1. Carrier member 10 has a plurality of fine, parallel gas flow passages 16 formed therein, which are better seen in enlarged FIGS. 1A and 1B. Gas flow passages 16 are formed by walls 18 and extend through carrier 10 from end face 14 to the opposite end face thereof, the passages 16 being unobstructed so as to permit the flow of a fluid, e.g., a gaseous stream, longitudinally through carrier 10 via gas flow passages 16 thereof. A layer 20, which in the art and sometimes below is referred to as a "washcoat", is adhered to the walls 18 and, as shown in FIG. 1A, may be comprised of a single layer comprising a mixture of oxidation catalyst and $NO_x$ sorbent material. Alternatively, as illustrated in FIG. 1B, layer or washcoat 20 may comprise a first discrete underlayer 20a and a second discrete overlayer 20b superposed over underlayer 20a. The underlayer 20a preferably is comprised of the oxidation catalyst and the overlayer 20b is preferably comprised of the $NO_x$ sorbent material. However, the arrangement of the layers may be reversed, with the underlayer 20a comprised of the $NO_x$ sorbent material and the overlayer 20b comprised of the oxidation catalyst. The $NO_x$ sorbent material is permeable to the gaseous components of the combustible component and to the gaseous stream generally, as is the lean $NO_x$ abatement catalyst, so that the gaseous stream and the combustible component may readily penetrate both layers of material. For purposes of illustration, the thickness of washcoat 20, underlayer 20a and overlayer 20b are exaggerated in FIGS. 1A and 1B.

The refractory carrier member alternatively may comprise a body of beads, pellets or particles (collectively referred to as "carrier beads") made of a suitable refractory material such as gamma-alumina, coated with the lean $NO_x$ abatement catalyst and the $NO_x$ sorbent material. A body of such carrier beads may be contained within a suitable perforated container which permits the passage of the exhaust gas therethrough. A proportion, e.g., approximately one-half, of the carrier beads may have the lean $NO_x$ abatement catalyst coated thereon and the remainder may have the catalyzed $NO_x$ sorbent material coated thereon with the two types of carrier beads thoroughly admixed.

Because the passages 16 of the carrier member 10 of FIGS. 1, 1B and the interstices between the beads of a carrier bead embodiment provide void spaces, the total volume of such void space in a given trap member (or catalyst member) will vary depending on the specific dimensions and shape of the carrier beads or of passages 16 and walls 18. It is therefore conventional practice to express the quantity of the components of the member as weight per unit volume of the member body. Therefore, quantities of the components of such members may be described herein in terms of grams per cubic foot ("g/ft$^3$") or grams per cubic inch ("g/in$^3$"), the volume in each case being the volume of the member.

Figure 2:
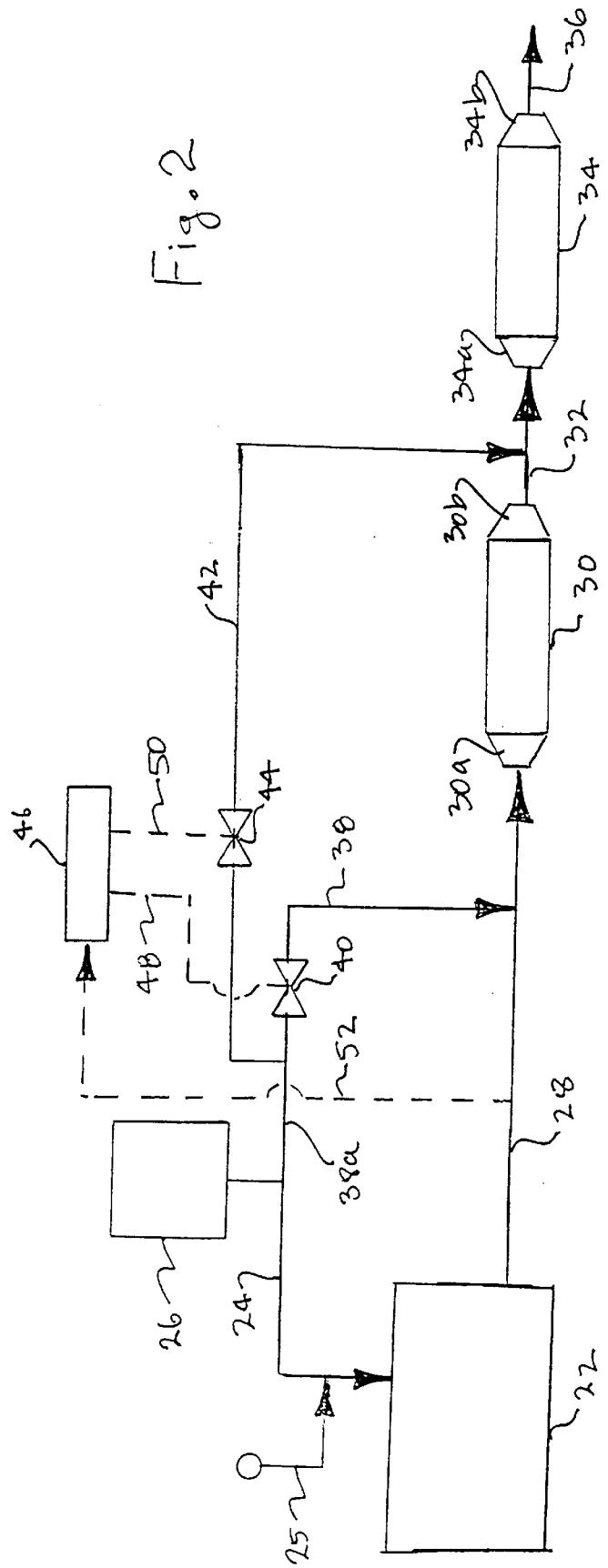
FIG. 2 is a schematic diagram of a system for $NO_x$ abatement in accordance with one embodiment of the present invention.

An apparatus in accordance with one embodiment of the present invention is illustrated in FIG. 2 wherein a source of the gaseous stream to be treated such as a diesel engine 22, is supplied with fuel via a fuel line 24 and fuel tank 26 and combustion air via line 25. An exhaust pipe 28 conveys engine exhaust from engine 22 to a $NO_x$ trap canister 30, which may comprise a suitable canister having mounted therewithin a $NO_x$ trap member such as one comprising the carrier member 10 of FIG. 1 having a suitable sorbent material/oxidation catalyst washcoat layer 20 thereon. Canister 30 has an inlet means 30a which is dimensioned and configured to have secured thereto in gas-flow communication exhaust pipe 28. At its opposite end, canister 30 has an outlet means 30b which is dimensioned and configured to have secured thereto in gasflow communication a connector conduit 32, the opposite end of which is connected in gas-flow communication to a $NO_x$ abatement catalyst canister 34 by inlet means 34a. $NO_x$ abatement catalyst canister 34 is fitted in gas-flow communication by its outlet means 34b to an outlet line 36 for discharge of the treated exhaust gaseous stream therefrom. $NO_x$ abatement catalyst canister 34 contains therewithin a catalyst member which may comprise a carrier such as carrier member 10 of FIG. 1, wherein the washcoat layer 20 thereof comprises a suitable $NO_x$ abatement catalyst, such as a platinum catalytic component catalyst or a metal-promoted zeolite.

A combustible component inlet means comprises a combustible component inlet conduit 38 having a leg 38a and which receives fuel from fuel tank 26 when a first control valve 40 is opened. A $NO_x$ reductant conduit 42 is connected via leg 38a in flow communication between fuel tank 26 and connector conduit 32. $NO_x$ reductant conduit 42 supplies fuel from fuel tank 26 to $NO_x$ abatement catalyst canister 34 when second control valve 44 is in its open position.

In the illustrated embodiment a control means 46 is operatively connected via first control line 48 to first control valve 40 and via second control line 50 to second control valve 44. Control means 46 receives control signals via input line 52 which, in the illustrated embodiment, is connected to a sensor (not shown) to sense the temperature of the gaseous stream in exhaust pipe 28. Any other suitable source of a control signal may be used, such as signals from sensors placed in the exhaust gas to monitor $NO_x$ content, combustible component content, or any other suitable parameters.

In operation, the exhaust gas stream emanating from engine 22 is transmitted by exhaust pipe 28 to the $NO_x$ trap member contained within canister 30, wherein $NO_x$ contained in the gaseous exhaust is sorbed onto the $NO_x$-sorbent material. During this trapping period valve 40 is closed so that combustible components are not fed into the gaseous stream entering $NO_x$ trap canister 30. The $NO_x$ depleted gaseous stream exits via connector conduit 32 and passes into $NO_x$ abatement catalyst canister 34 wherein the gaseous stream may be catalytically treated to remove any $NO_x$ which was not sorbed within $NO_x$ trap canister 30. The treated gaseous stream is then discharged to the atmosphere via outlet line 36. Alternatively, the treated gaseous stream may be passed via outlet line 36 to additional treatment, although that is usually not necessary. After a period of time, a sensor (not shown) in exhaust pipe 28 delivers a control signal via input line 52 to control means 46, which generates a signal to open valve 40 to admit via leg 38a and line 38 a combustible component, in this embodiment diesel fuel, into the gaseous stream entering $NO_x$ trap canister 30. The amount of combustible component introduced is not so great as to change the overall composition of the gaseous stream from lean to rich; the bulk gaseous stream retains its lean character. However, sufficient combustible component is introduced to thermally desorb $NO_x$ upon oxidation of the combustible component. The oxidation catalyst contained within $NO_x$ trap canister 30 promotes oxidation of the combustible component within $NO_x$ trap canister 30, thereby heating the $NO_x$-sorbent material contained therein sufficiently to thermally desorb sorbed $NO_x$ from the $NO_x$-sorbent material without significantly raising the bulk temperature of the gaseous stream passing through $NO_x$ trap canister 30.

Oxidation of the combustible component may be catalyzed by any suitable oxidation catalyst, e.g., an oxidation catalyst having a catalytic metal component such as one or more platinum group metals and/or a base metal catalytic metal component such as oxides of one or more of copper, cobalt, vanadium, iron, manganese, etc. However, in addition to catalyzing the oxidation of the combustible component, the oxidation catalyst serves to promote sorption of $NO_x$ by the $NO_x$ sorbent material and for this purpose a platinum metal component is preferred and may even be essential because it is so superior to other oxidation catalyst moieties with respect to promoting $NO_x$ sorption by the sorbent material. The desorbed $NO_x$ passes via connector conduit 32 to $NO_x$ abatement catalyst canister 34, wherein $NO_x$ is reduced. $NO_x$ abatement conditions are maintained within $NO_x$ abatement catalyst canister 34 because the temperature of the gaseous stream exiting $NO_x$ trap canister 30 is maintained within a suitable $NO_x$ abatement temperature range notwithstanding the limited oxidation of combustible component on or immediately adjacent to the $NO_x$-sorbent material contained within $NO_x$ trap canister 30.

During the abatement period, it may be necessary or desirable to provide a $NO_x$ reductant, such as a hydrocarbon, to the gaseous stream being fed into lean $NO_x$ abatement catalyst canister 34. In the illustrated embodiment, this is attained by providing a limited amount of the fuel from fuel tank 26 via $NO_x$ reductant conduit 42 by opening valve 44. A suitable signal provided via second control line 50 may serve to open valve 44.

After a suitable period, a supply of the combustible component via combustible component inlet conduit 38 is terminated by closing valve 40 to end the abatement period and commence a new trapping period. Trapping and abatement periods are alternated during operation to provide an effective and efficient method of purifying the exhaust stream from engine 22, which may operate continuously under lean conditions while nonetheless providing satisfactory $NO_x$ abatement.

Modern diesel engines tend to generate relatively little HC and CO and the exhaust and governmental regulations limiting HC and CO content are usually satisfied without the necessity of abating HC and CO. However, it will be appreciated by those skilled in the art that a supplemental catalyst member may be employed, or the catalyst composition contained within $NO_x$ abatement catalyst canister 34 may be modified or supplemented to provide catalytic abatement of at least some of the relatively minor amounts of HC and CO which may be contained in the exhaust.

The $NO_x$ Sorbent Material

Generally, the $NO_x$ sorbent material is promoted in its sorbent function by a platinum catalytic component placed in intimate combination with the sorbent material. The platinum metal component may thus perform a double duty in promoting both sorbent activity of the sorbent material and oxidation of the combustible component. The sorbent material itself comprises at least one basic oxygenated metal compound and, as indicated above, may either be dispersed onto a refractory support material such as activated alumina, or may be present in bulk form, i.e., as fine particles of the basic oxygenated metal compound. As used herein and in the claims, an "oxygenated metal compound" means a compound of metal and oxygen which may or may not contain other elements. For example, the basic oxygenated metal compound may comprise one or more of a metal oxide, a metal carbonate, a metal hydroxide or a mixed metal oxide. The metal of such compounds (at least one of the metals in the case of the mixed oxides) is preferably selected from the group consisting of one or more of lithium, sodium, potassium, rubidium, cesium, magnesium, calcium, strontium and barium. A preferred group of $NO_x$ sorbent materials is one or more oxides or hydroxides of one or more of magnesium, calcium, strontium and barium. Strontium oxide and barium oxide have been found to be especially useful $NO_x$ sorbent materials. As indicated above, the strontia and/or baria (or other sorbent material or materials) may be present in bulk form, i.e., as fine particles, or may be supported on a suitable support material such as particles of activated alumina. The $NO_x$ sorbent material will be present in an amount calculated to provide adequate sorption for the intended use. A typical quantity of the basic metal oxygenated compound will be from about 0.05 to 3 g/in³ of the $NO_x$ trap member.

The $NO_x$ sorbent material may optionally include a sulfur compound sorbent such as ceria, either as bulk ceria or as ceria dispersed into the particles of $NO_x$ sorbent material. Reference to ceria or any other component as "bulk" means that the component was introduced into the compositions as fine, solid particles, i.e., as a powder. Reference to ceria or any other component as "dispersed" into another (bulk) material means that the component or a precursor of it is incorporated into the bulk material from a solution or suspension of the component or its precursor. For example, in the case of dispersing ceria into the $NO_x$ sorbent material, fine particles of the latter may be soaked in a solution of a soluble cerium salt such as cerium nitrate, and then dried and heated in air to convert the cerium nitrate to cerium oxide (ceria). It has been found that when present in either bulk or dispersed form, ceria facilitates coating the carrier member with a washcoat of the $NO_x$ sorbent material. The $NO_x$ sorbent material may thus advantageously contain ceria in a weight ratio of ceria to $NO_x$ sorbent material of from about 0.1 to 100:1 and may also contain a binder such as alumina to enhance adherence of the $NO_x$ sorbent material to the carrier member.

The Oxidation Catalyst

The oxidation catalyst may be any suitable catalyst which will catalyze the oxidation of hydrocarbons in a gaseous stream in the presence of oxygen. The gaseous stream treated by the present invention must contain, or have added to it, sufficient oxygen to support the catalyzed oxidation of the combustible component. Inasmuch as diesel engines inherently operate in a lean mode, the exhaust of a diesel engine inherently contains more than sufficient oxygen for the purposes of the present invention. The preferred oxidation catalyst is one comprising platinum dispersed on a refractory metal oxide support, preferably a high surface area metal oxide support such as activated alumina. Thus, a suitable oxidation catalyst may comprise platinum as the sole catalytic metal component dispersed on a suitable support such as activated alumina. The platinum oxidation catalyst has also been found to promote the sorbent activity of the $NO_x$ sorbent material.

The Lean $NO_x$ Abatement Catalyst

The lean $NO_x$ abatement catalyst may comprise any catalyst which will catalyze the reduction of $NO_x$ in the presence of a suitable reductant. The reductant is usually comprised of hydrocarbons, e.g., in the case of treating the exhaust from an internal combustion diesel or gasoline engine running in the lean mode. The lean $NO_x$ abatement catalyst may thus comprise any suitable catalyst containing a platinum catalytic metal component. In a typical composition of the present invention, the amount of platinum group metal present will be from about 2 to 150 g/ft$^3$, preferably from about 5 to 70 g/ft$^3$.

The lean $NO_x$ abatement catalyst may comprise a catalytic metal component, preferably a platinum group metal, most preferably a platinum catalytic component, dispersed on a suitable support. The support may be an amorphous or refractory metal oxide. For example, alumina, titania, silica, silica-zirconia, silica-titania and zirconia each comprise suitable supports. Alternatively, or in addition, the lean $NO_x$ abatement catalyst may comprise a precious metal or a base metal-promoted zeolite. Such materials may comprise a platinum or copper or multi-metal promoted zeolite. Examples of the latter include, as disclosed in copending, commonly assigned application Ser. No. 08/241,072, filed in the name of J. S. Feeley et al, a zeolite such as the proton and cation forms of Y-zeolite, Beta-zeolite, ZSM-5, mordenite or ferrierite or mixtures thereof promoted with copper, iron and cobalt, e.g., from about 2 to 8 percent by weight copper, 1 to 4 percent by weight iron and 0.25 to 4 percent by weight cobalt. Other zeolite catalysts may be used, such as a platinum or copper-promoted zeolite catalysts, e.g., platinum or copper-promoted ZSM-5 or mordenite. Another suitable lean $NO_x$ abatement catalyst comprises one or more platinum group metals, preferably platinum, disposed on a molecular sieve material or the like, e.g., one or more of ZSM-5, Y-zeolite, mordenite, Beta-zeolite, Omega-zeolite, rho-zeolite, borosilicates and iron silicates. Such compositions are disclosed in copending, commonly owned patent application Ser. No. 08/430,065 filed in the name of M. Deeba et al. As described in copending, commonly owned patent application Ser. No. 08/241,020 also filed in the name of M. Deeba et al, the zeolite may advantageously be fluoride-treated.

The following examples illustrate the preparation and testing of specific embodiments of the invention.

EXAMPLE 1

Preparation of Platinum/$Al_2O_3$ Catalyst

A. 150 grams of gamma-alumina powder (SBA-150) and 400 grams of water were ballmilled for 1 hour. To this slurry, 16.84 grams of a chloride-free platinum solution (18.24 weight percent platinum) was added followed by 7.5 ml of acetic acid. The resulting slurry was ballmilled at 36% solids to give a particle size of 90% of the particles having a diameter less than 9.3 microns.

B. A cylindrical, 400 cells per square inch ("cpsi") cordierite honeycomb measuring 1.91 cm in diameter and 2.54 cm in length (0.75"×1.0") was dipped into the slurry obtained in Part A followed by drying and calcination at 550° C. for 2 hours to give a washcoat loading of 2.1 g/in$^3$. Platinum loading was 73.5 g/ft$^3$. The resulting sample was designated E1. ("Washcoat" is the dried coating, including the platinum loading.)

EXAMPLE 2

Preparation of PS1 $NO_x$ Traps: E2 through E4

A. Samples E2 through E4 were prepared identically to sample E1 to give the following washcoat and platinum loadings after calcination: E2, E3 and E4:=2.1 g/in$^3$ washcoat; 73.5 g/ft$^3$ platinum These samples were further coated with a layer of SrO plus $Al_2O_3$ and calcined again at 550° C. for 2 hours to give a second topcoat washcoat superposed over the first washcoat. The topcoat loadings were as follows:

E2:=1.2 g/in$^3$

E3:=1.8 g/in$^3$

E4:=1.1 g/in$^3$

B. A slurry of SrO plus $Al_2O_3$ was prepared as follows. 150 g of strontium oxide and 50 g of alumina powder (SBA-150) were mixed together. To this mixture 400 g of water (chilled in an ice bath) was added slowly with stirring controlling the exotherm in the slip to less than 40° C. The mixture was allowed to stir in the ice bath for about 2 hours. Then 30 ml of acetic acid was added to the slip with stirring followed by 31 g of a binder (Nyacol 20: 20% $Al_2O_3$ by weight). The resulting slip was ballmilled overnight to a particle size of 90% of the particles having a diameter less than 9 microns and then applied as a topcoat to the samples obtained in part A of this Example.

The tests carried out in the following examples were all conducted with lean gas mixtures.

EXAMPLE 3

Figure 3:
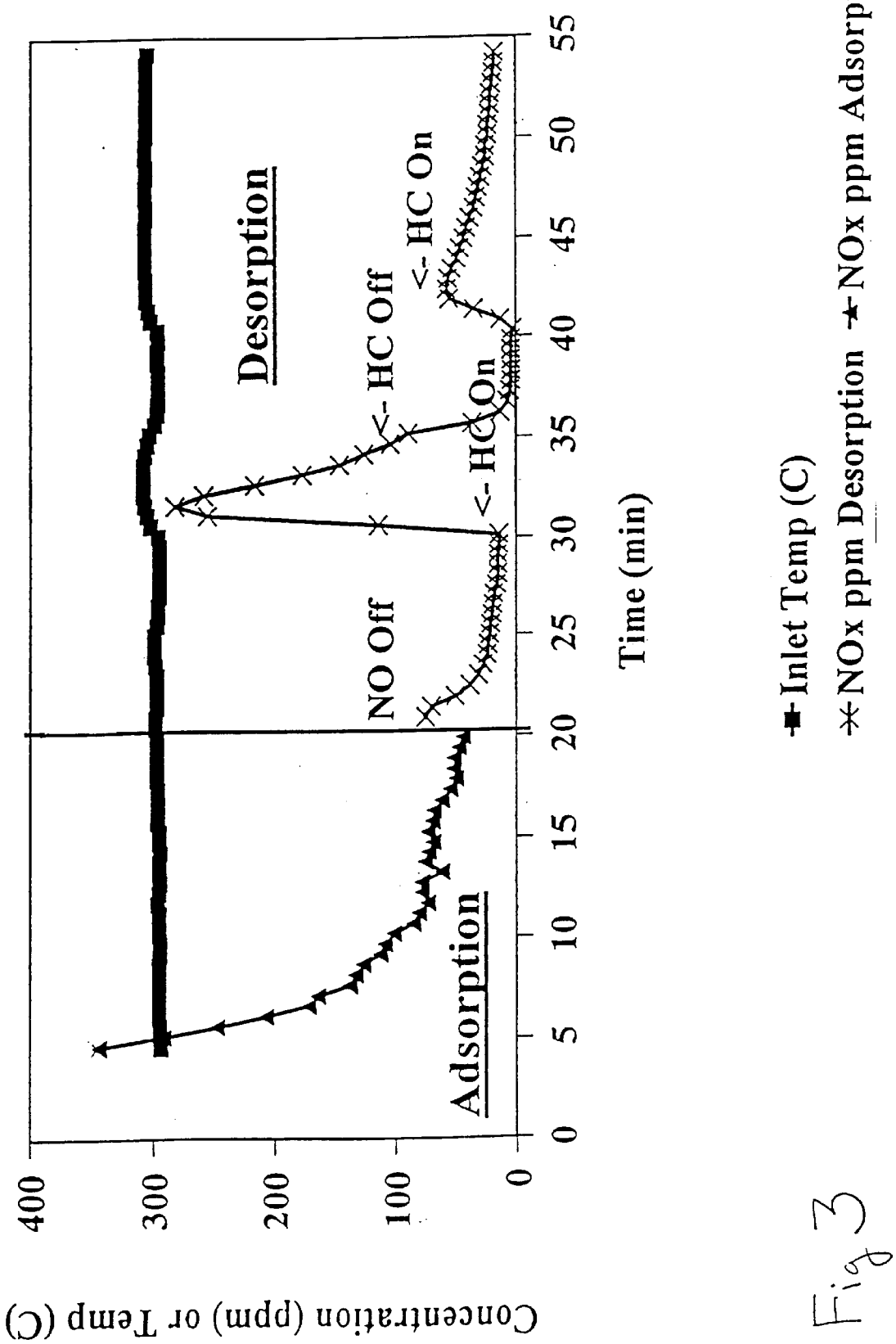
FIGS. 3 through 10 show various graphs plotting the tests of the examples.

In FIG. 3, $NO_x$ concentration is plotted as a function of time at 300° C., 25,000/h space velocity ("SV") over E2. Space velocity is given as volumes of gas measured at standard conditions of temperature and pressure passing through the sample per hour ("h"). In the first 20 minutes of the test the ability of the trap to adsorb $NO_x$ was determined using a feed gas comprised of 10% $H_2O$, 10 $O_2$, 25 ppm $SO_2$ and 1000 ppm $NO_x$. This adsorption step is shown in FIG. 3 as ppm $NO_x$ adsorbed plotted against time up to 20 minutes. After this 20 minute dousing of the trap with $NO_x$, the $NO_x$ concentration in the feed was decreased to 0 ppm (keeping SV at 25,000/h) and a small amount of thermal desorption of $NO_x$ (less than 80 ppm) from the trap was observed between 20–29 minutes time on stream (TOS). At 30 minutes TOS, 6500 ppm $C_1$ (using $C_3H_6$) was added to the feed stream (again keeping SV at 25,000/h) and a sharp peak (max=275 ppm $NO_x$) due to $NO_x$ desorption was observed. This release of $NO_x$ was in large excess to the amount released thermally from 20–29 minutes TOS thereby indicating that HC enhances $NO_x$ desorption under the current lean conditions. Removing the HC at 35 minutes TOS resulted in a sharp decrease in $NO_x$ desorption. Addition of HC again at 40 minutes TOS again results in a sharp increase in $NO_x$ desorption (max=55 ppm $NO_x$). Since most of the $NO_x$ trapped in the initial dousing step (time=0 to 20 minutes) was released in the first HC injection step (time =30 to 35 minutes), i.e., partially cleaning the trap, the second HC injection step results in a lower amount of $NO_x$ desorption.

The gas phase temperatures at the trap inlet, also shown in FIG. 3, show only about a 5–10° C. increase upon addition of HC; however, the local temperature in the washcoat is elevated to much higher levels, to within the $NO_x$ desorption range, upon HC addition, the exotherm caused by the HC combustion process providing the energy for desorption.

EXAMPLE 4

Figure 4:
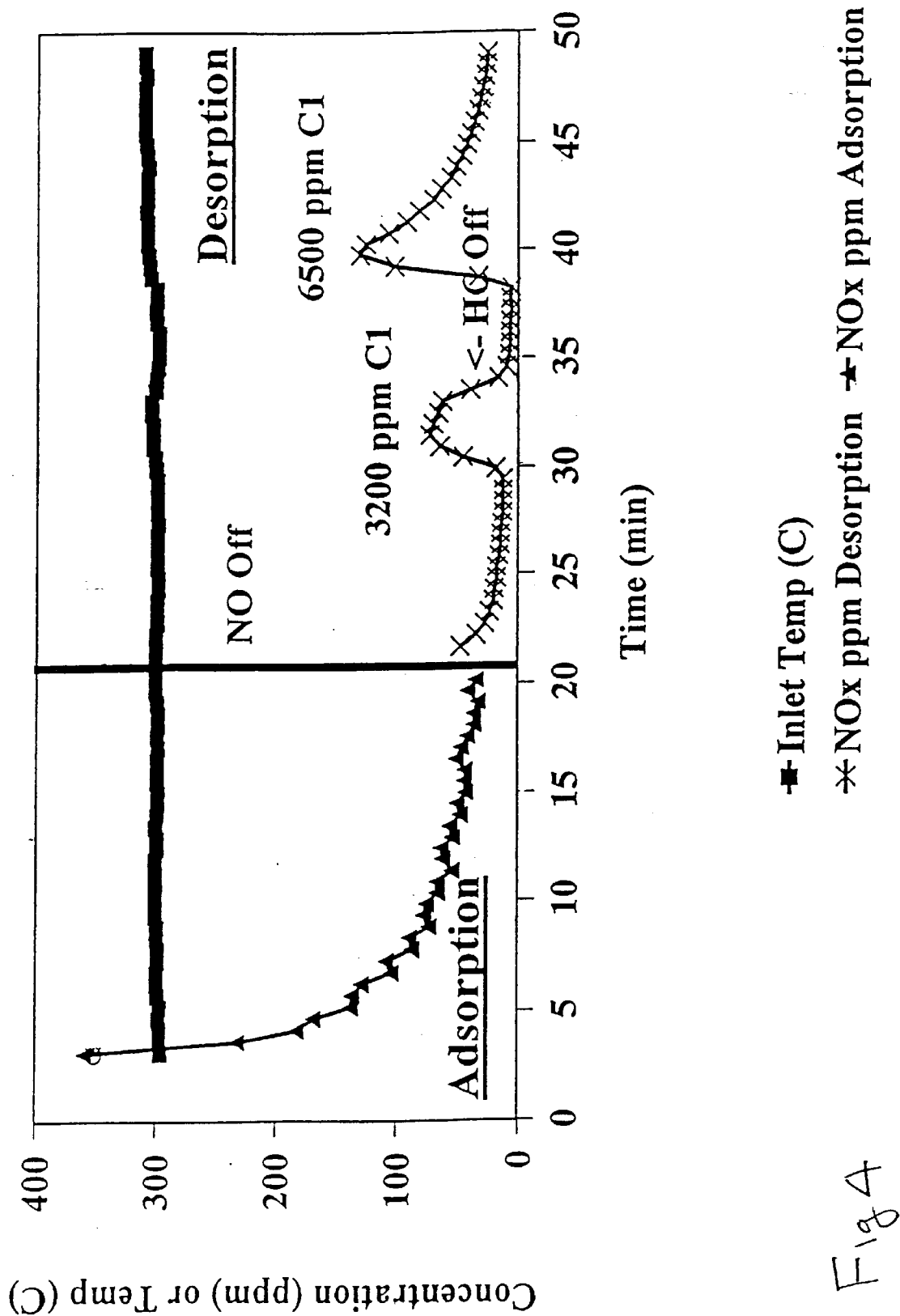

The same Sample E2 used in Example 3 was subjected to further testing in Example 4 (FIG. 4). After the experiment carried out in Example 3, the trap was again exposed to a feed containing 10 volume percent $O_2$, 10 volume percent $H_2O$ balance nitrogen, 25 ppm $SO_2$ and 1000 ppm NO for 20 minutes at 300° C. and 25,000/h as described in Example 3, in order to douse the trap with $NO_x$.

After the $NO_x$ adsorption step described above, the NO was removed from the feed at 20 minutes TOS. As in Example 3, a small release (less than 40 ppm) of $NO_x$ due to thermal desorption is seen at this point from 20–29 minutes TOS. At 30 minutes TOS 3200 ppm $C_1$, provided by propylene, $C_3H_6$, is added to the feed to induce $NO_x$ desorption. The maximum value of $NO_x$ desorption observed in this process was about 70 ppm $C_1$ (using propylene). Removal of hydrocarbons from the feed at 35 minutes TOS resulted in a sharp decrease in $NO_x$ desorption. The addition of 6500 parts per million $C_1$ (using propylene) at 38 minutes TOS versus the initial injection of 3200 ppm $C_1$ at 30 minutes TOS, resulted in an even higher level of $NO_x$ desorption (max=130 ppm $NO_x$ desorbed) than observed in the first HC addition step.

These results in Examples 3 and 4, FIGS. 3 and 4 respectively, show that it is possible to use HC addition to induce $NO_x$ desorption from the sample trap with little effect on bulk gas temperature. In addition, as the amount of HC added increases, the amount of $NO_x$ desorbed increases as well. This is shown in even greater detail in Example 5.

EXAMPLE 5

Figure 5:
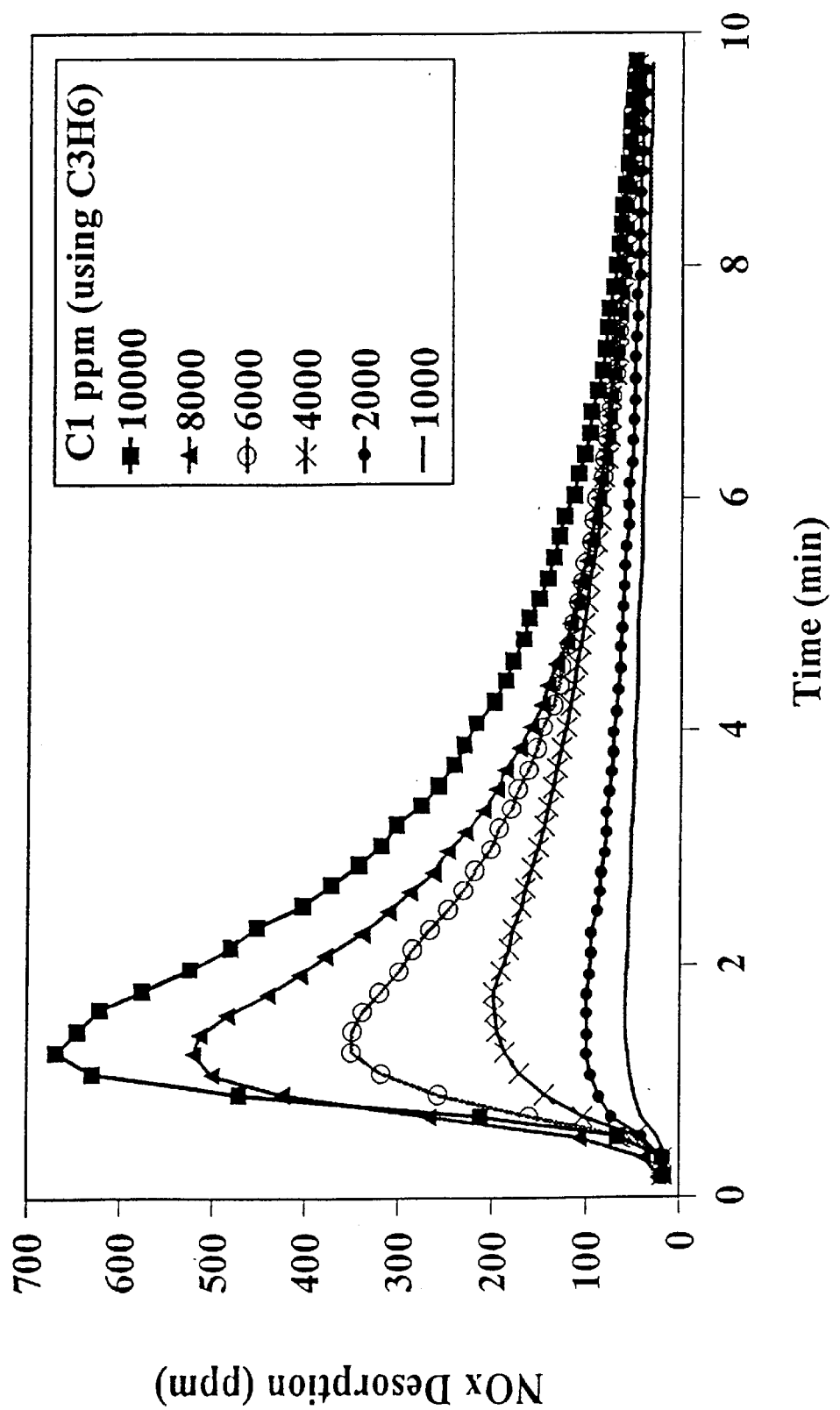

In this example a fresh piece of Sample E3 was used to test the effect of HC concentration on NO desorption from the trap material at 300° C. and 25,000/h. Before each HC injection, the sample was redoused with a feed containing 1000 ppm $NO_x$, 10% $H_2O$ and 7% $O_2$ at 300C and 25,000/h for 15 minutes followed by a 5 minute purge at the same conditions without NO in the feed. All HC injections consisted of adding propylene to the feed for 10 minutes after the $NO_x$ dousing and purge steps, keeping all other experimental conditions constant. The sequence of HC, injections expressed as volume parts per million $C_1$ was as follows: 10,000; 8000; 6000; 4000; 2000; 1000; and 10,000. Again there was a $NO_x$ dousing and purge step between these injections. FIG. 5 shows the $NO_x$ desorption profiles versus time during these HC injections. Note the clear correlation between the extent of $NO_x$ desorption and the HC concentration. The two data points at 10,000 ppm $C_1$ were fairly close, indicating good reproducibility of the data. The second data point (not shown) showed release of a maximum of 720 ppm $NO_x$ and the first data point (shown) shows releasing a maximum of 680 ppm $NO_x$. This data may be within experimental error, or it is possible that there was more $NO_x$ adsorbed on the trap before the second 10,000 ppm $C_1$ HC injection than before the first simply because during the preceding desorption periods using lower HC injection values, all of the $NO_x$ is not removed from the trap.

The data in this example show again that increasing the local surface temperatures in the trap by providing a higher level of combustibles in the feed allows more effective cleaning of $NO_x$ from the trap.

EXAMPLE 6

In this example a fresh piece of Sample E4 was used to study the effect of inlet temperature on $NO_x$ trapping and HC induced $NO_x$ desorption. All experiments were isothermal at 25,000/h in a 7% $O_2$, 10% $H_2O$ feed containing 1000 ppm NO during the adsorption tests which were 15 minutes and 8000 ppm $C_1$ (using $C_3H_6$) during HC induced $NO_x$ desorption tests. The experiments were carried out as follows:

1) 15 minute adsorption test (with 1000 ppm NO)
2) 5 minute purge (no HC or NO)
3) 10 minute desorption test (with 8000 ppm $C_1$)
4) purge and cool to repeat steps 1 through 3 at next temperature starting at 450° C. inlet and testing at progressively cooler inlet temperatures, 450; 400; 350; 300; 250; 200; and 150° C.

Figure 6:
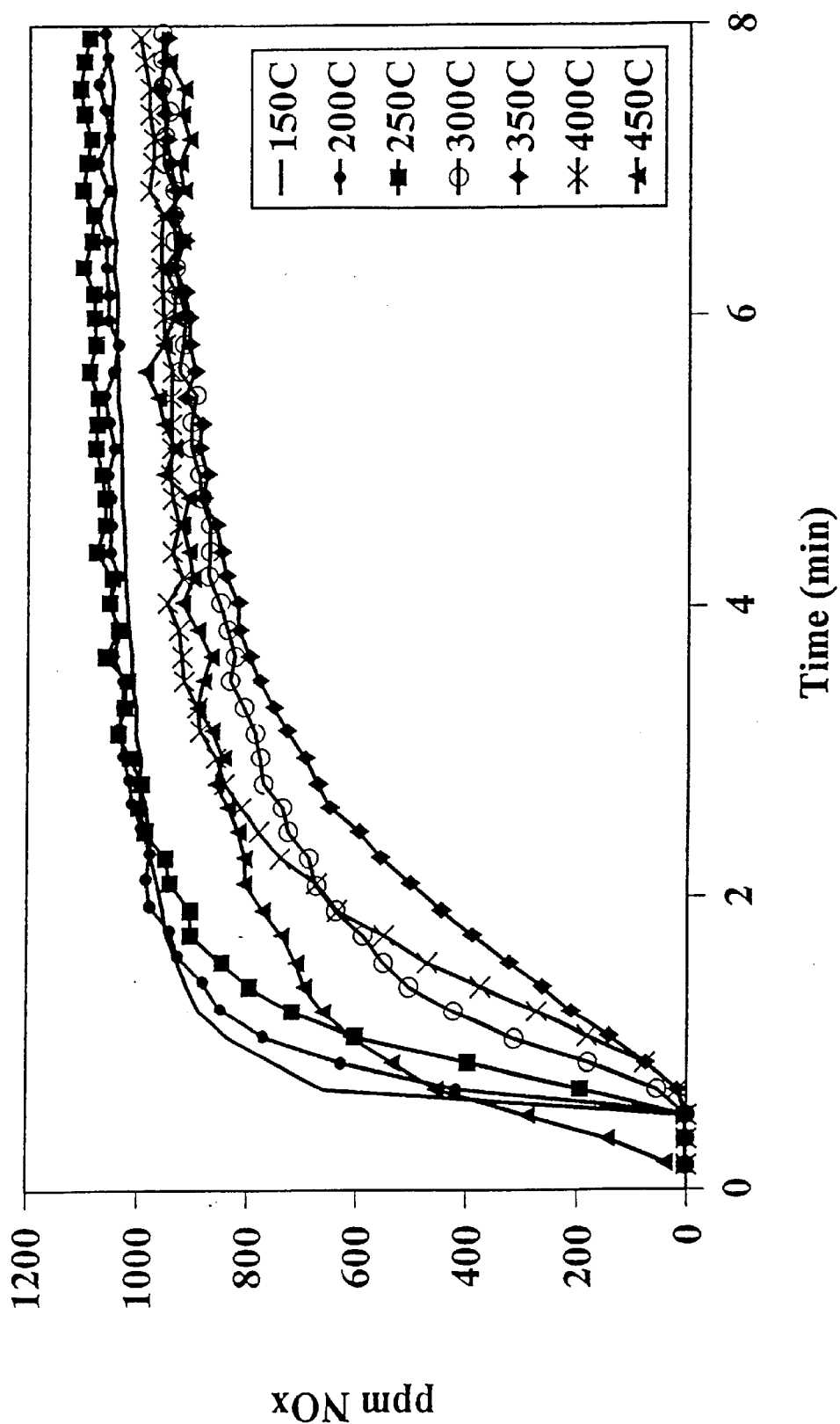
Figure 7:
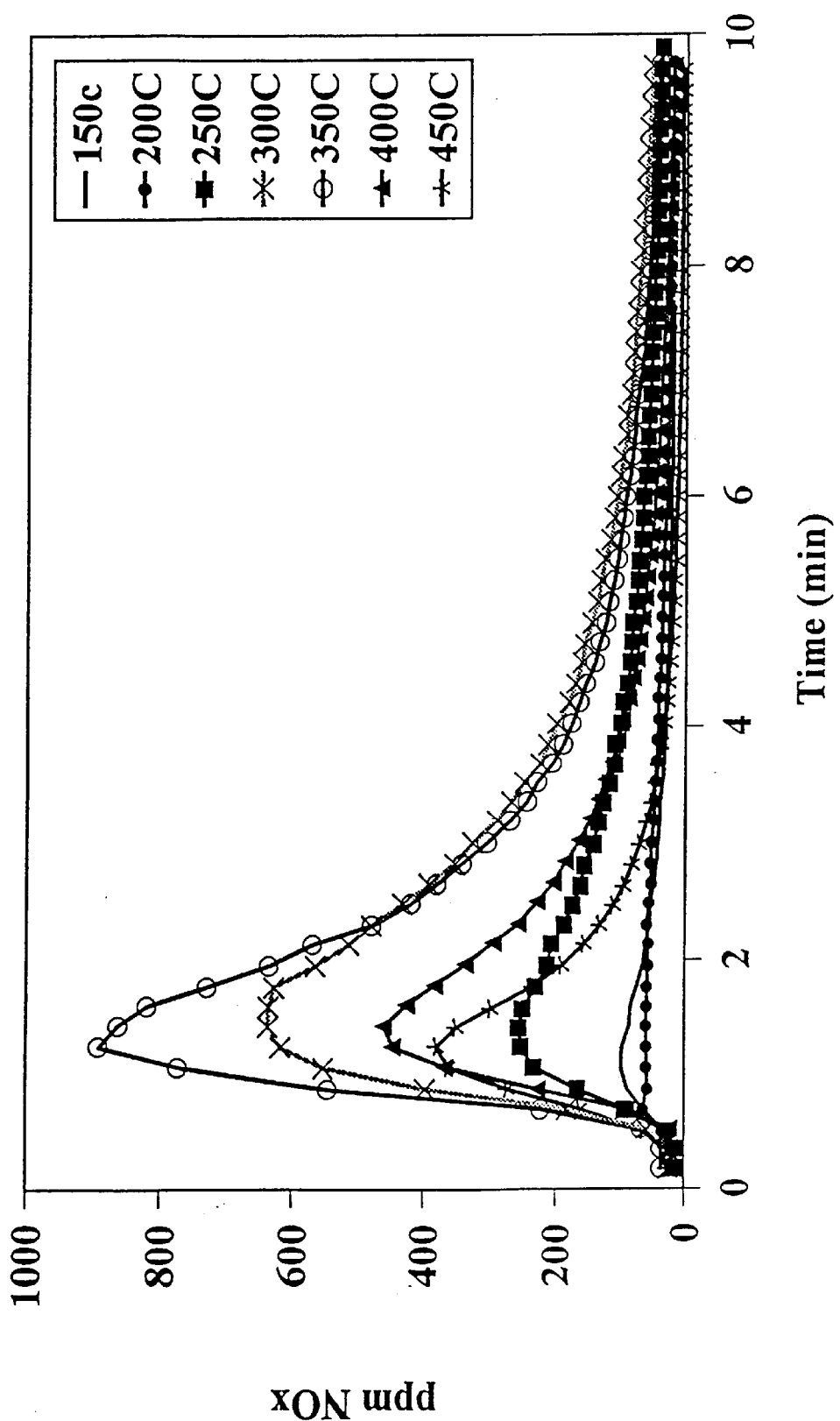
Figure 8:
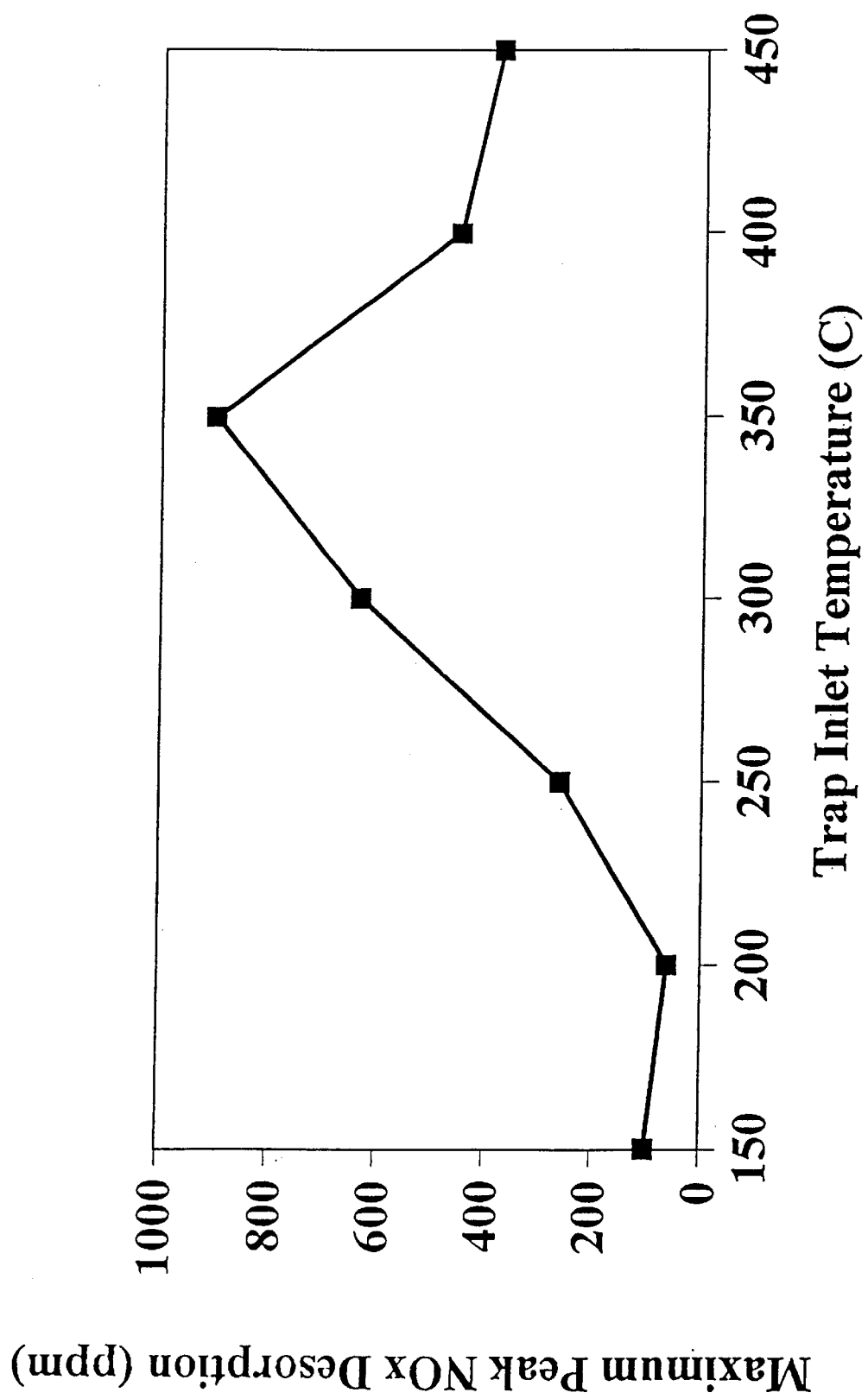

FIG. 6 shows the NO adsorption curves obtained in step 1 above for each temperature. Only the first 8 minutes of this step is shown in order to expand the scale where most of the $NO_x$ adsorption is occurring. From these results it appears that $NO_x$ adsorption is maximized between 300–450° C., and primarily between 300–400° C. In FIG. 7, the HC-induced $NO_x$ desorption profiles at various temperatures (i.e., step 3 above) are plotted. It appears that $NO_x$ desorption is greatest in the same temperature range 300–450° C. as $NO_x$ adsorption. This is shown again in FIG. 8 by plotting the maximum ppm $NO_x$ desorbed during these experiments as a function of temperature.

The results of this example show that the phenomenon of HC-induced $NO_x$ desorption will occur over a wide range of trap inlet temperatures. The specific conditions used in actual applications must be tailored to the trap and catalyst materials used and the specific needs of the application, e.g., engine exhaust conditions and emission regulations.

EXAMPLE 7

In this example, a complete $NO_x$ abatement system, i.e., $NO_x$ trap plus lean $NO_x$ catalyst, is tested. The trap material used in this test was Sample E3, of Example 5. The lean $NO_x$ catalyst is Sample E1. For the first 10 minutes of this test the conditions were as follows:

SV=25,000/h
Temp., $NO_x$ Trap (E3)=300° C.
Temp., $NO_x$ Catalyst (E5)=210° C.
NO=250 ppm
$O_2$=7%
$H_2O$=10%
$SO_2$=25 ppm
HC=0 or 7000 ppm $C_1$ added in a periodic fashion, HC-on 60 seconds/HC-off 60 seconds, using propylene $C_3H_6$ for the $C_1$.

Figure 9:
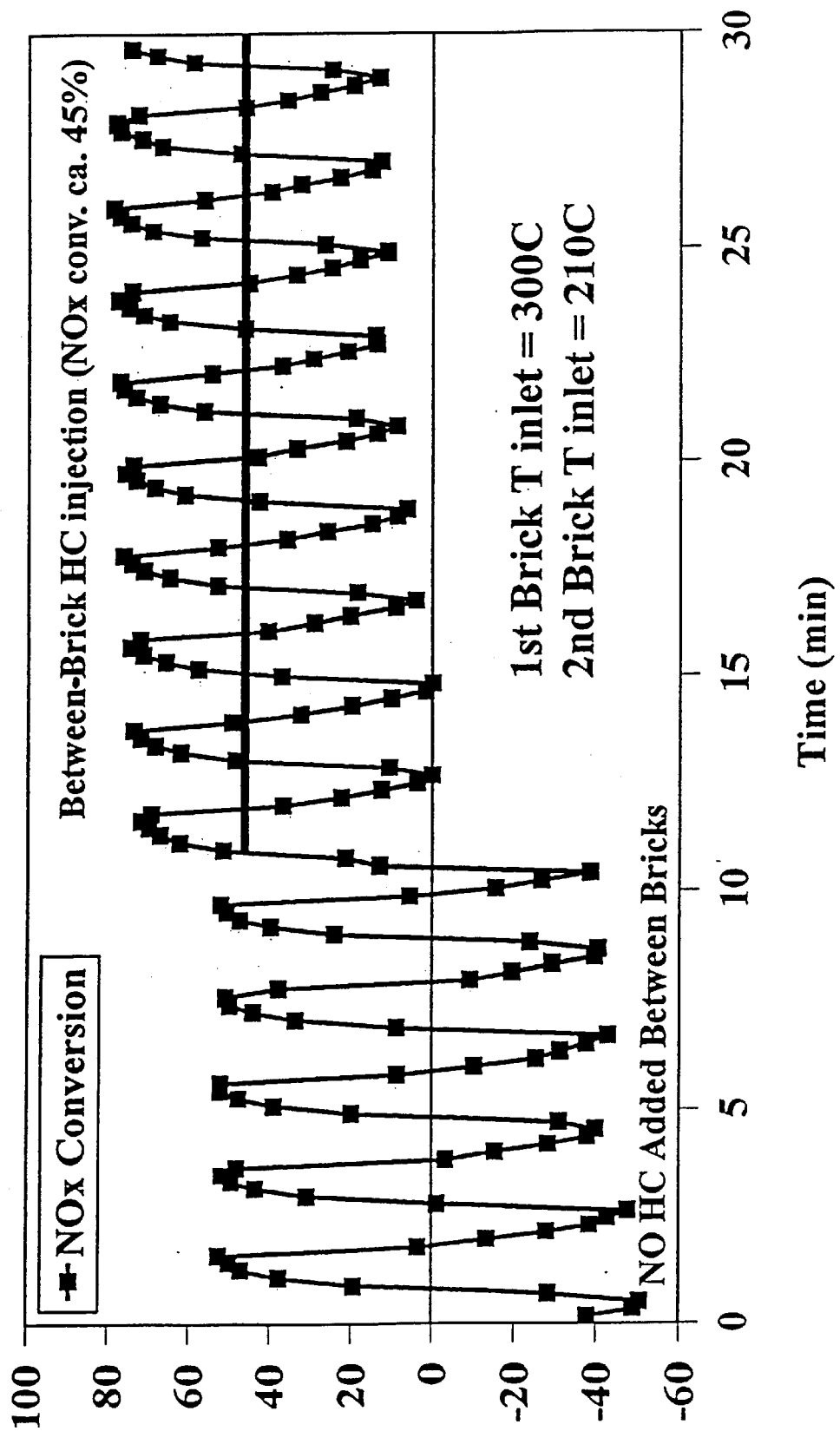

The results of this test are shown in FIG. 9 wherein $NO_x$ removal by the system is plotted as a function of time and wherein the term "brick" is (as in FIG. 10) used to refer to, respectively, the $NO_x$ trap member ("1st Brick") and the lean $NO_x$ abatement catalyst ("2nd Brick"). When HCs are introduced into the feed to the first brick, the percent $NO_x$ removal appears as a negative number, indicating HC-induced $NO_x$ desorption. When HCs are out of the feed, the trap is active for $NO_x$ adsorption and percent $NO_x$ removal is positive. The start of each HC addition (HC-on) during the first 10 minutes TOS is indicated by a sharp decrease in $NO_x$ removal in FIG. 9, and the start of each HC-off is indicated by a sharp increase in $NO_x$ removal. Accordingly, the HC-on points are just ahead of the peaks and the HC-off points are just ahead of the valley bottoms in FIG. 9. In the first 10 minutes the trap is burning all of the HCs fed into it and no HC breaks through to the downstream lean $NO_x$ catalyst so there is no net $NO_x$ conversion during this period. In short, during the first 10 minutes TOS, without HC introduction between the 1st brick and the 2nd brick, the average net $NO_x$ removal was negligible, as $NO_x$ sorption was canceled out by $NO_x$ desorption caused by HC addition to the feed to the 1st brick. This contrasts with the results obtained when secondary HC injection (between the 1st brick and the 2nd brick) was employed to provide an adequate reductant-to-$NO_x$ ratio in the gaseous stream entering the 2nd brick, as described below.

After getting the 10 minute baseline, at 11 minutes TOS, the secondary HC injection (between the 1st brick and the 2nd brick) is activated and 1000 ppm $C_1$ (using propylene) is fed into the system between the $NO_x$ trap (E3) and the lean $NO_x$ catalyst (E1). Upon the addition of this HC source between the trap member and the lean $NO_x$ abatement catalyst, a dramatic increase in $NO_x$ removal, to about 45% of the $NO_x$ present, was observed. During HC-on modes, where HC injection before the $NO_x$ trap induces $NO_x$ desorption, $NO_x$ conversion over the entire system increases from a net release of about 40% to a net abatement of about 15–30%. This should be compared to the results obtained in the first 10 minutes of the test when no HC was introduced between the trap member (1st brick) and the lean $NO_x$ abatement catalyst (2nd brick) and $NO_x$ removal in the HC-on mode was negative (up to −50%). These results demonstrate that the lean $NO_x$ catalyst material downstream of the trap can effectively reduce $NO_x$ released from the trap. Even a 0% $NO_x$ removal during HC-on modes over this system corresponds to an actual conversion versus the baseline case of the first 10 minutes TOS.

During HC-off modes, the trap adsorbs $NO_x$ in a manner similar to its performance in the first 10 minutes of the test. In addition, there is a boost to overall $NO_x$ removal by the downstream lean $NO_x$ catalyst which reduces roughly 40% to 50% of the $NO_x$ which breaks through the trap. This reduction raises $NO_x$ removal from about 50% without secondary HC injection (first 10 minutes of test) to 70% with secondary HC injection.

This example demonstrates the behavior of the system shown schematically in FIG. 2. In this test the HC was added periodically (60 seconds on/60 seconds off) with a trap inlet temperature of 300° C. and a HC concentration of 7000 ppm. The other examples show that this invention will work over a wide range of trap inlet temperatures and HC concentrations. These parameters, along with HC injection frequency, must be optimized for a particular application around its needs and the trap's characteristics (i.e., capacity, trapping and releasing rates). The controlled HC introduction releases sorbed $NO_x$ in a controlled fashion, when the downstream lean $NO_x$ catalyst is in its active temperature range. The frequency of use of the HC-induced desorption will depend not only on the temperature in the lean $NO_x$ catalyst but on the trap's capacity and rate of $NO_x$ adsorption and desorption. The system as a whole gives effective $NO_x$ removal provided that there is enough reductant entering the lean $NO_x$ abatement catalyst to supply the needed reductant-to-$NO_x$ ratio for lean $NO_x$ abatement.

EXAMPLE 8

Figure 10:
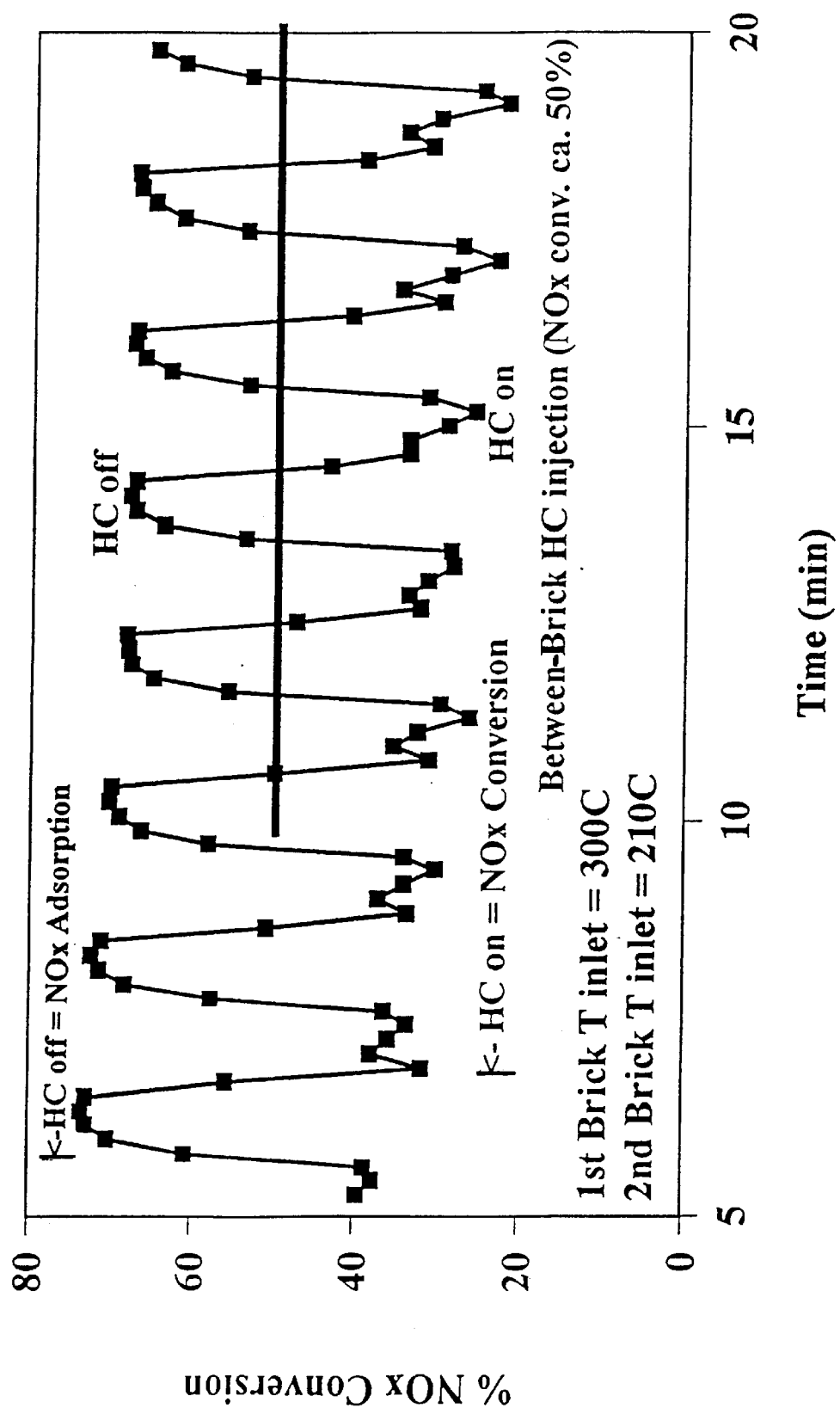

The same setup, experimental conditions, and material (E3 and E1) used in Example 7 were further tested in this example. This test was carried out under identical experimental conditions as given in Example 7 except that the concentration of the HC added between the trap and catalyst member was increased from 1000 ppm $C_1$ to 2000 ppm $C_1$. The resulting average $NO_x$ conversion over the period increased from 45% in Example 7 to 50% in this example, as seen in FIG. 10, as a result of this increase in HC. In addition, net $NO_x$ conversion was always above 20% even in HC-on modes, indicating that the conversion in Example 7 over the lean $NO_x$ catalyst during HC-induced $NO_x$ desorption was limited by the HC/NO ratio of the gas introduced into the lean $NO_x$ catalyst.

The HC/$NO_x$ ratio can be adjusted in accordance with the invention by introducing a suitable $NO_x$ reductant, e.g., HC, between the trap and the lean $NO_x$ catalyst.

While the invention has been described in detail with respect to specific embodiments thereof, it will be appreciated that numerous variations to the specific embodiments may well occur to those skilled in the art upon a reading and understanding of the foregoing and it is intended to embrace such variations within the scope of the appended claims.

What is claimed is:

1. A method for the reduction of $NO_x$ in a lean $NO_x$-containing gaseous stream comprises:
   (a) passing the lean gaseous stream through a catalyzed $NO_x$ trap member comprising an intimate combination of a catalyst material effective for promoting the oxidation of a combustible component in the gaseous stream, and a $NO_x$ sorbent material, the gaseous stream being passed through the trap member within a sorbing temperature range to sorb $NO_x$ in the trap member whereby to establish a trapping period and provide a $NO_x$-depleted gaseous stream exiting the trap member during the trapping period;
   (b) passing the gaseous stream exiting the trap member through a lean $NO_x$ reduction catalyst member;
   (c) introducing the combustible component into the gaseous stream at a location upstream of the trap member under conditions to combust the combustible component on the trap member, the combustible component being introduced in an amount which is limited in order to maintain the bulk composition of the gaseous stream lean but which is enough to heat at least a portion of the trap member to a release temperature sufficient to release trapped $NO_x$ from the trap member into the gaseous stream exiting the trap member thence through the catalyst member, whereby to establish a desorbing period;
   (d) maintaining lean $NO_x$-reduction conditions in the catalyst member at least during the desorbing period; and
   (e) alternating the establishment of the trapping period of step (a) and the desorbing period of step (c).

2. The method of claim 1 wherein the maintaining of lean $NO_x$-reduction conditions in the catalyst member during step (d) comprises supplying a $NO_x$ reductant to the catalyst member.

3. The method of claim 2 including maintaining a molar ratio of reductant (on a C1 basis) to $NO_x$ of from about 0.5 to 8 in the gaseous stream entering the catalyst member.

4. The method of claim 3 including maintaining a molar ratio of reductant to $NO_x$ of from about 1 to 4.

5. The method of claim 2 including introducing a $NO_x$ reductant into the lean gas stream between the trap member and the catalyst member.

6. The method of claim 2 including introducing the combustible component in step (c) in an amount sufficient to supply from the combustible component at least part of the $NO_x$ reductant.

7. The method of claim 1 including maintaining lean $NO_x$-reduction conditions in the catalyst member even while passing the $NO_x$-depleted gaseous stream therethrough.

8. The method of claim 1 or claim 2 wherein the $NO_x$ sorbent material comprises at least one basic oxygenated compound and the catalyst member comprises a $NO_x$ abatement catalyst selected from the group consisting of a platinum group metal component and a metal-promoted zeolite.

9. The method of claim 8 wherein the $NO_x$ sorbent material is selected from the group consisting of one or more of metal oxides, metal carbonates, metal hydroxides and mixed metal oxides and the catalyst member comprises a lean $NO_x$ abatement catalyst selected from the group consisting of (a) a platinum group metal component dispersed on a support material and (b) a metal-promoted zeolite.

10. The method of claim 1 or claim 2 wherein the sorbent material is segregated from the catalytic metal component of the oxidation catalyst, at least to the extent that (a) when the sorbent material is dispersed on a support material, the catalytic metal component and the sorbent material are not dispersed on the same increment of support material, and (b) when the sorbent material is in bulk form, the catalytic metal component is not incorporated into the bulk sorbent material.

11. The method of claim 1 or claim 2 comprising maintaining the gaseous stream exiting the trap member within a temperature range below that of the release temperature range during both the trapping period and the desorbing period.

12. The method of claim 1 or claim 2 comprising maintaining the gaseous stream exiting the trap member within a temperature range below that of the release temperature range and within the effective operating temperature range of the lean $NO_x$ reduction catalyst.

13. The method of claim 12 wherein the catalyst member comprises a lean $NO_x$ abatement catalyst selected from the group consisting of (a) a platinum group metal component dispersed on a support material and (b) a metal-promoted zeolite.

14. The method of claim 1 or claim 2 wherein the lean gaseous stream comprises the exhaust of a diesel engine.

15. The method of claim 1 or claim 2 wherein the combustible component comprises a hydrocarbon.

16. An apparatus for the reduction of $NO_x$ in a lean, $NO_x$-containing gaseous stream comprises:
(a) an inlet conduit dimensioned and configured for connection in flow communication to a source of a lean gaseous stream containing $NO_x$;
(b) a catalyzed $NO_x$ trap member having a trap inlet and a trap outlet, the trap inlet being connected in flow communication to the inlet conduit, the trap member comprising an intimate combination of a catalyst material effective for promoting the oxidation of hydrocarbons in the gaseous stream and a $NO_x$ sorbent material;
(c) a lean $NO_x$ catalyst member having a catalyst inlet and a catalyst outlet;
(d) a connector conduit connecting the trap outlet to the catalyst inlet in flow communication;
(e) combustible component inlet means connected in flow communication to the inlet conduit; and
(f) control means associated with the combustible component inlet means to permit intermittent injection of a combustible component into the inlet conduit.

17. The apparatus of claim 16 comprising further including a reductant inlet conduit having one end dimensioned and configured for connection to a source of a $NO_x$ reductant and an opposite end connected in flow communication to the connector conduit.

18. The apparatus of claim 16 comprising control means associated with the reductant inlet conduit to permit controlled injection of a reductant into the connector conduit.

19. The apparatus of claim 16 or claim 17 wherein the $NO_x$ trap member comprises a $NO_x$ trap material selected from the group consisting of one or more of metal oxides, metal carbonates, metal hydroxides and mixed metal oxides and the catalyst member comprises a $NO_x$ abatement catalyst selected from the group consisting of a platinum group metal component dispersed on a support material and a metal-promoted zeolite.

20. The apparatus of claim 16 wherein the catalytic metal component comprises platinum and the sorbent material is segregated from the catalytic metal component at least to the extent that (a) when the sorbent material is dispersed on a refractory support material, the catalytic metal component and the sorbent material are not dispersed on the same increment of refractory support material, and (b) when the sorbent material is in bulk form, the catalytic metal component is not impregnated into the bulk sorbent material.

21. The apparatus of claim 20 wherein the sorbent material is selected from the group consisting of one or more of metal oxides, metal carbonates, metal hydroxides and mixed metal oxides.

22. The apparatus of claim 20 or claim 21 wherein the oxidation catalyst is admixed with the sorbent material.

23. The apparatus of claim 20 or claim 21 wherein the oxidation catalyst and the sorbent material are disposed on a refractory carrier member and the oxidation catalyst is disposed as a first discrete layer on the refractory carrier member and the sorbent material is disposed as a second discrete layer overlying the first layer.

* * * * *